E. HEITMANN.
SQUIRREL CAGE ROTOR FOR ELECTRIC MOTORS.
APPLICATION FILED JULY 15, 1908.

919,862.  Patented Apr. 27, 1909.

Witnesses:
Samuel W. Balch
Frank C. Cole

Inventor,
Edward Heitmann.
by Thomas Ewing Jr.
Attorney.

UNITED STATES PATENT OFFICE.

EDWARD HEITMANN, OF MONTCLAIR, NEW JERSEY, ASSIGNOR TO CROCKER-WHEELER COMPANY, OF AMPERE, NEW JERSEY, A CORPORATION OF NEW JERSEY.

SQUIRREL-CAGE ROTOR FOR ELECTRIC MOTORS.

No. 919,862.  Specification of Letters Patent.  Patented April 27, 1909.

Application filed July 15, 1908. Serial No. 443,713.

*To all whom it may concern:*

Be it known that I, EDWARD HEITMANN, a citizen of the United States of America, and a resident of Montclair, county of Essex, and State of New Jersey, have invented certain new and useful Improvements in Squirrel-Cage Rotors for Electric Motors, of which the following is a specification.

This invention relates to the construction, in combination with a laminated core, of the secondary element in a rotor.

The object of this invention is to secure by a rotor of proper design in an induction motor, a machine having low reactance and high starting torque, with high power factor and overload capacity, operating at high current densities, in which both electric flow and magnetic flux are well distributed, avoiding harmful eddy currents, which will run cool, and in which the centrifugal force tends to increase the electrical and mechanical connection between the rotor bars.

A further object is to provide a form inexpensive of manufacture, and with parts easy to assemble and secure firmly so as to form an electrically well connected and mechanically rigid structure.

Figure 1:
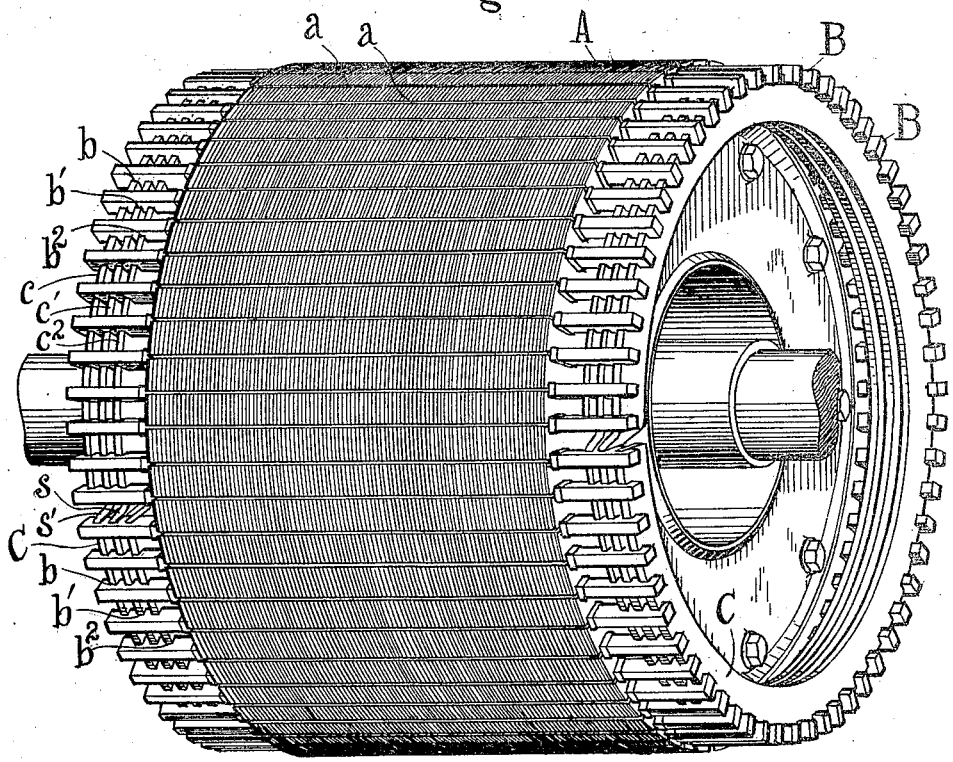
Figure 2:
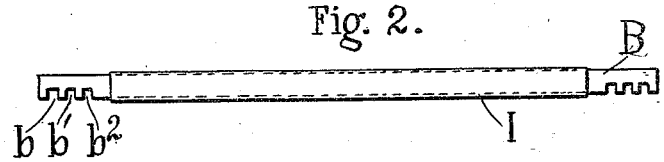
Figure 3:

In the accompanying sheet of drawings, which forms a part of this application, Figure 1 is a perspective view of a rotor for an induction motor embodying my invention. Fig. 2 is an elevation of one of the conductor bars, and Fig. 3 is an edge view of the preferred form of one of the coils which are employed to electrically connect the bars.

A core formed of laminated plates A has in its periphery parallel partially closed slots $a$ $a$ through which conductor bars B B are inserted, the ends of the bars projecting beyond the core. The lips of the slots are integral with the laminations and overlap the bars and nearly meet, thereby utilizing substantially the entire convex surface of the core for receiving the magnetism while preventing magnetic leakage above the bars and securing the required uniformity of distribution of magnetic flux without affording a seat for eddy currents. The overlapping lips afford an absolutely reliable means for securing the bars. The portions of the bars which pass through the core laminations are wrapped with insulation I. The bars of the preferred form have transverse slots $b$ $b'$ $b^2$ near each end, the slots being in the sides which face the axis of the rotor. Corresponding slots, which are similarly lettered in the different bars, when the bars are assembled in the core, are brought into the same plane of rotation. Coils C C, which may be formed of copper strips bent edgewise, engage the slots in the bars and are employed to electrically connect the bars. In the preferred form, each coil has a plurality of convolutions $c$ $c'$ $c^2$ equal in number to the number of slots at each end of the bars B B and together forming a spiral, each convolution engaging all the corresponding slots of said bars. The spiral is preferably irregular in that a portion of each convolution sufficient to embrace all the bars is brought truly into a plane of rotation and each convolution connected with the adjoining convolution through a short offset section $s$ $s'$ within the space of two adjoining bars. This has the convenience of permitting the bars to be exactly alike in the locations of the slots and interchangeable.

It will readily be understood that a plurality of slots at each end of the bar, and consequently a plurality of convolutions in the engaging coils are not essential to this invention.

By reason of the slots in the core having permanent overlapping lips the bars are of necessity inserted endwise through the core slots and before the coils are connected thereto. Since, when in the core, they are thereby locked against radial displacement, the engaging coils must be so constructed as not to close on themselves, that is, they must be of such a discontinuous character as will permit of their being brought within the circle of the sides of the bars which face the axis of the rotor and then expanded or sprung into engagement with the slots. The coils and bars are preferably soldered together to insure proper electrical connection. Soldering, however, is not essential to the mechanical connection, since there are no mechanical strains which would tend to separate the parts.

Further advantages in the foregoing construction which will be apparent in view of this description follow from the absence of screws, bolts or rivets. For this admits of the number of bars being multiplied to an extent which would be impracticable if such connecting devices were employed. The bars may therefore be thinner on account of their being more numerous, thereby eliminating harmful eddy currents. The multiplication of convolutions in the coils has a like advantage, and the further advantage of increasing the radiating surface, and thereby also preventing an excessive rise of temperature.

What I claim as new, and desire to secure by Letters Patent of the United States, is—

1. In a squirrel-cage rotor adapted for use as the secondary element of an induction motor, the combination with a laminated core of conductor bars carried thereby and having transverse slots near their ends in the sides facing the axis of the rotor, and coils engaging said slots and electrically connecting the bars, substantially as described.

2. In a squirrel-cage rotor adapted for use as the secondary element of an induction motor, the combination with a laminated core of conductor bars carried thereby, each of said bars having a plurality of slots near each end in the side facing the axis of the rotor, and coils engaging said slots and electrically connecting the bars, substantially as described.

3. In a squirrel-cage rotor adapted for use as the secondary element of an induction motor, the combination with a laminated core of conductor bars carried thereby, each of said bars having a plurality of slots near each end in the side facing the axis of the rotor, and coils engaging said slots each of which has a plurality of convolutions and electrically connects the bars, substantially as described.

4. In a squirrel-cage rotor adapted for use as the secondary element of an induction motor, the combination with a laminated core of conductor bars carried thereby, each of said bars having a plurality of slots near each end in the side facing the axis of the rotor, the corresponding slots of all the bars lying in the same plane of rotation, and coils having a plurality of convolutions so formed that each convolution engages the corresponding slots, substantially as described.

Signed by me at East Orange, N. J., this 14th day of July, 1908.

EDWARD HEITMANN.

Witnesses:
SAMUEL W. BALCH,
ARTHUR C. BUNKER.